United States Patent
Hovermale et al.

[11] 3,723,583
[45] Mar. 27, 1973

[54] ORIENTATION OF TUBULAR POLYPROPYLENE FILM

[75] Inventors: Ralph Allen Hovermale, Clinton, Iowa; George Joseph Ostapchenko, Williamsville, N.Y.; Hung Han Yang, Clinton, Iowa

[73] Assignee: E. I. du Pont de Nemours and Company, Wilmington, Del.

[22] Filed: Feb. 10, 1971

[21] Appl. No.: 114,355

Related U.S. Application Data

[63] Continuation of Ser. No. 765,177, Oct. 4, 1968, abandoned.

[52] U.S. Cl. ............ 264/40, 264/89, 264/95, 264/210 R, 264/289
[51] Int. Cl. .................... B29c 17/07, B29d 7/24
[58] Field of Search ....... 264/95, 210 R, 89, 40, 234, 264/289

[56] References Cited

UNITED STATES PATENTS

| | | | |
|---|---|---|---|
| 3,499,064 | 3/1970 | Tsuboshima et al. | 264/95 |
| 3,231,642 | 1/1966 | Goldman et al. | 264/25 |
| 3,325,575 | 6/1967 | Last | 264/95 |
| 3,248,463 | 4/1966 | Wiley et al. | 264/95 |

Primary Examiner—Robert F. White
Assistant Examiner—Jeffery R. Thurlow
Attorney—Donald W. Huntley

[57] ABSTRACT

A process for orienting tubular polypropylene film to minimize shrinkage and total haze of the oriented film comprising reducing the temperature drop and maintaining a low bubble hoop stress prior to quenching.

3 Claims, 3 Drawing Figures

PATENTED MAR 27 1973

INVENTORS
RALPH ALLEN HOVERMALE
GEORGE JOSEPH OSTAPCHENKO
HUNG HAN YANG

BY Donald W. Huntley
ATTORNEY

ORIENTATION OF TUBULAR POLYPROPYLENE FILM

This application is a continuation of Ser. No. 765,177 filed Oct. 4, 1968 and now abandoned.

BACKGROUND OF THE INVENTION

Polypropylene film is frequently extruded in tubular form, and is biaxially oriented while still in a tubular configuration. Orientation is effected by simple longitudinal stretching of the tubular structure, combined with expanding the tube by internal pressure. This type of orientation can be carried out with apparatus of the general type described in Goldman et al., U.S. Pat. No. 3,231,642, hereby incorporated by reference. In such apparatus, the tubular structure is drawn past a heating element to raise the temperature to within the orientation temperature range of the film. Shortly after passing the heating element, upon reaching the orientation temperature, the tube is expanded by the air pressure inside the tube. Conventionally, a current of air is passed over the exterior surface of the tube to improve gage uniformity and to provide the required cooling curve stretch. At the tube's maximum expanded diameter the film is quenched by passing the expanded tube through a cooling sleeve.

While this process satisfactorily orients the film, several difficulties are encountered in its commercial application. For example, orientation often degrades the optical qualities of the film and yields a product which exhibits a substantial degree of heat shrinkage after orientation. Continual attempts have therefore been made to improve the clarity and reduce the shrinkage of polypropylene films prepared and oriented by a tubular process.

SUMMARY OF THE INVENTION

The instant invention provides a process for the orientation of tubular polypropylene films which results in a minimal impairment of the optical properties of the film and a combined machine direction and transverse direction shrinkage of less than 25 percent. Specifically, the instant invention provides an improvement in the process for orienting tubular polypropylene film by heating the film to a temperature within the orientation temperature range and biaxially stretching the film by radial expansion and linear extension of the tube, and cooling at maximum expansion, the improvement comprising
a. maintaining the temperature drop of the film to not more than 15°C. from the initial radial expansion to the point at which the tube reaches its maximum expanded diameter and
b. maintaining a bubble hoop stress no greater than 3,200 psi prior to cooling.

DESCRIPTION OF THE PREFERRED EMBODIMENTS

Figure 1:
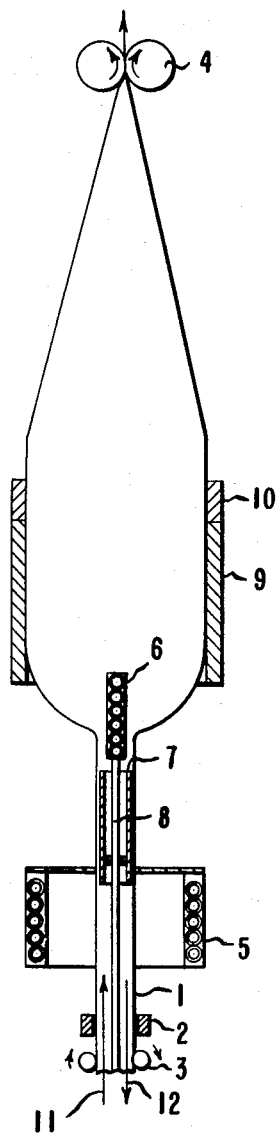
FIGS. 1 and 2 are schematic illustrations of two specific types of apparatus which can be used in the process of the instant invention.

It is known in the art that minimum shrinkage in a biaxially oriented polypropylene film can be approached by a simultaneous, uniform stretching of the film in mutually perpendicular directions under isothermal conditions. While attempts have been made to modify the process for orientation of a tubular polypropylene film structure to approximate simultaneous stretching along the machine direction and transverse direction axes, these conditions have been commercially impractical. In conventional tubular orientation processes, it has been found that the machine direction and transverse direction orientation is to some degree sequential, in that the desired degree of machine direction stretching is generally completed before one-half of the desired degree of transverse direction stretching has been accomplished.

The instant invention rests on the discovery of other factors which contribute to the shrinkage of oriented film. Specifically, it has been discovered that the shrinkage of the oriented film to a certain extent varies inversely with the temperature at which the film is oriented, and that the shrinkage of the oriented film increases with larger temperature drops during the orientation process. Still another factor that has been found to be critical in the shrinkage of the oriented film is that the final shrinkage varies directly with the bubble hoop stress during the orientation. By regulation of these additional factors, it has been found that the shrinkage of polypropylene film oriented in a tubular process can be maintained below 25 percent, a level heretofore unobtainable in a commercial tubular orientation process. The term "shrinkage" is used herein to mean the additive total of the percent shrinkages along both the machine and transverse axes of the film when exposed to a temperature of 130° C. for 1 minute.

As indicated above, one of the critical factors in the attainment of minimal shrinkage of the oriented film is the maintenance of the temperature of the film during orientation within 15° of the original temperature to which the film was heated at the start of the orientation. This is basically contrary to the methods previously used in the art, in which the tubular film experienced a drop of greater than 20°C. between the initial expansion and the point at which the film had attained its maximum expanded diameter, simply by atmospheric cooling. The temperature drop in the orienting film was even greater in those processes wherein cooling air currents were circulated around the exterior of the expanding film, the temperature drop being as much as 30° to 50°C. According to the instant invention, the temperature of the film during this period is maintained within 15° of the temperature at which orientation is begun. This can be accomplished by any convenient heating apparatus. For example, a stationary heated element can be placed on the exterior of the expanded film. Such a heating element can be a radiant heater or can be internally heated by electrical coils or by the circulation of a heated fluid such as steam or oil. It has been found especially convenient to provide a coil in close proximity to the exterior of the tube having a fluid circulating therethrough at a temperature of about from 50° to 155°C.

It is preferred that the temperature of the film be maintained above 130° in order to give a film that is heat stable for a broad range of commercial applications. Since the normal temperatures to which polypropylene is heated for orientation are about from 140° to 158°C., the minimum temperature to which the orienting film should fall prior to quenching should be in the range of 130° to 143°C.

The second critical element in the process of the instant invention is the maintenance of the bubble hoop stress at a relatively low level prior to quenching after stretching. This factor rests on the discovery that the shrinkage of the oriented film decreases with decreasing bubble hoop stress regardless of the orientation geometry. The bubble hoop stress is related to the air pressure within the expanding film as well as the diameter and thickness of the film according to the following formula:

$$S = (Pd)/(2t)$$

where
 $S$ = hoop stress
 $P$ = bubble pressure
 $d$ = diameter at maximum expansion
 $t$ = thickness at maximum expansion The bubble hoop stress in the process of the instant invention, to achieve a minimal shrinkage in the oriented film must be maintained below 3,200 psi as determined by the above formula.

The instant invention will be better understood by reference to the Figures. FIG. 1 illustrates one particular apparatus which can be used in the orientation of tubular films according to the improved process of the instant invention. In that figure, the tubular film 1 is moved toward a guide ring 2, the ring serving to minimize sway of the tube. The tube is moved by means of tube advancer 3 and a set of nip rolls 4 rotating at a rate that is at least 2 times the rate of the tube advancer. The film is advanced through an initial radiant heater 5 concentrically positioned around the periphery of the tubular film, and connected to a power source, not shown. The initial radiant heater 5 serves to heat the film to a temperature within about 70 percent of the lowest temperature of the orientation temperature range to just below the orientation temperature range of the thermoplastic polymer.

The tubular film is brought to a temperature within the orientation temperature range and at which the film expands by means of a pencil-type, internal, centrally located radiant heater 6 mounted on the internal guide ring 7. Heater 6 is connected to a power source by wires leading through the conduit 8 to a power source, not shown. The tubular film, immediately upon reaching the orientation temperature range, starts to expand due to pressure within it and to elongate due to the relative rates of the nip rolls 4 and the tube advancer 3. Air or other gaseous medium is admitted through inlet 11 and vented through outlet 12 to regulate the pressure within the tube.

The expanding tube, as it is removed from the immediate proximity of internal heater 6, is heated by external heating element 9, which maintains the film within the desired temperature range until it reaches its maximum expanded diameter. Upon reaching its maximum diameter, the expanded tube is passed through cooling ring 10. The cooling ring is generally maintained at a temperature of about from 5° to 10°C. by circulation of cold water through the ring.

Figure 2:
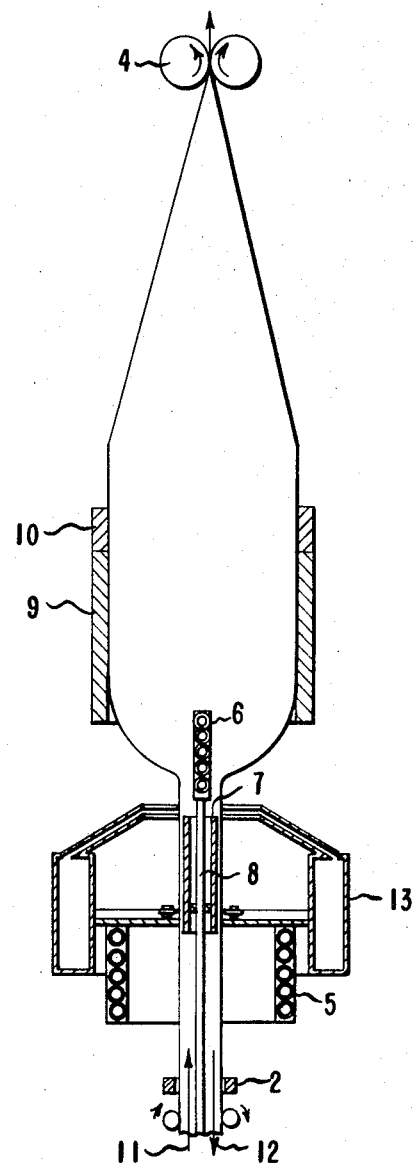

FIG. 2 illustrates another specific apparatus arrangement useful in the instant invention having an air cooling ring 13 inserted with the orifice of the ring directed at the plane of initial expansion. The cooling ring is regulated so as to improve gage uniformity as described in Goldman et al., U.S. Pat No. 3,231,642, while maintaining the temperature drop of the expanding film within the required limits.

Figure 3:
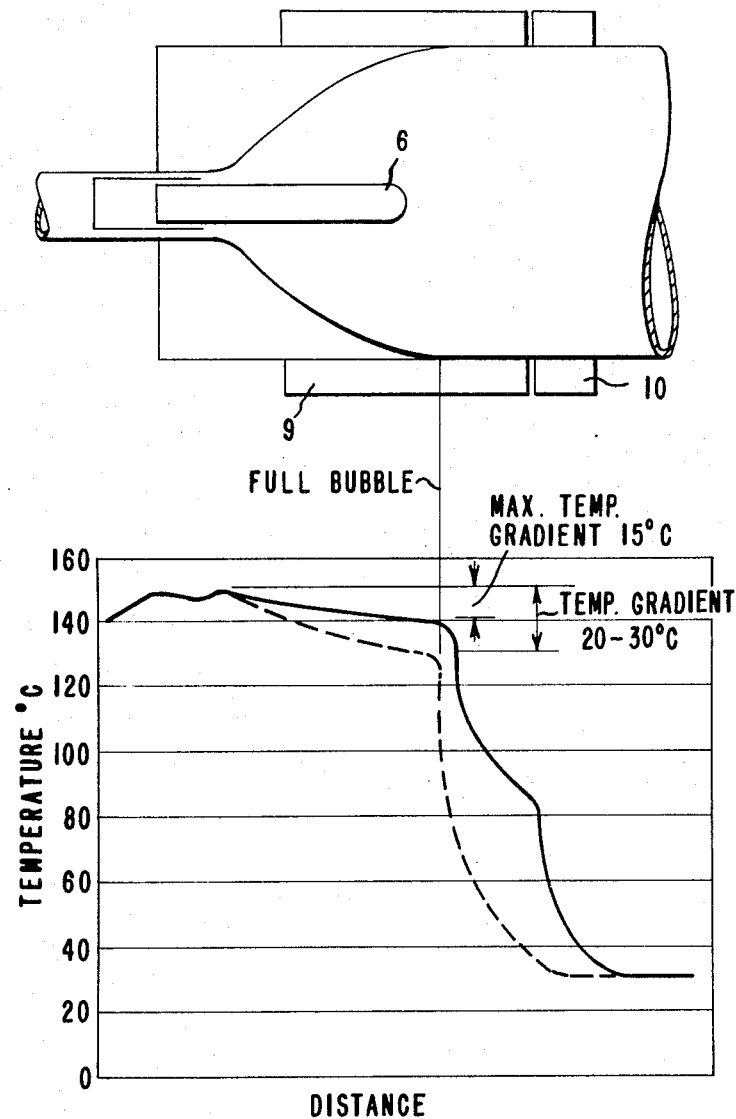
FIG. 3 is an illustration of a representative temperature profile in the process of the instant invention along various points in the expanding tube.

FIG. 3 is a diagrammatic illustration of the temperature profile of the film during the orientation process. The upper figure schematically illustrates the film during its expansion, consecutively passing the internal heater 6 and external heating element 9 and the quench ring 10. The graph in the lower portion of the figure illustrates the temperature profile during the expansion. The vertical scale indicates the temperature of a representative tubular polypropylene film while the horizontal scale directly corresponds to the expanding film illustrated in the upper portion of the figure, so as to indicate the temperature of the film at the various points in its expansion. The temperature profile of a representative film oriented according to the process of the instant invention is indicated by a solid line in the lower portion of FIG. 3 while a representative temperature profile of films oriented according to processes previously used in the art is indicated by the broken line. As can be seen from the figure, the maximum temperature gradient between the initial heating at the beginning of the orientation process and the point at which the expanding tube reaches its maximum diameter is 15° in the process of the instant invention, while the temperature gradient exceeds 20° in the standard process.

The invention is further illustrated by the following specific examples.

EXAMPLE 1

A polypropylene film is extruded and stretch oriented on an apparatus of the type illustrated in FIG. 1. A polypropylene resin having a melt flow of 5.5 to 6.5 grams/10 minutes, a density of 0.905 grams/cc. and a crystalline melting point of 165°C. is extruded into the form of a tube at the rate of 39 lbs./hr. at a temperature of 195°C. The tube is extruded through an annular die having a 5 inch diameter. The film is quenched by passing the tube through a mandrel maintained at a temperature of 5°C. After the initial quenching, the tube has a film thickness of 14 mils and a temperature of 30°C. The tube is reheated by an internal heater to a temperature of 148°C. and is expanded to stretch orient the film. The expanding tube is encircled by a heated ring having a diameter of 25 inches. The heated ring extends along the tube for 21³⁄₈ inches and is maintained at a temperature of 110°C. The tube is expanded to a diameter of 25 inches by a bubble hoop stress of 2,550 psi. The temperature drop between the initial heating and the point to which the tube reaches its maximum diameter is 9°C. At the maximum diameter of the tube, the film has a thickness of 0.57 mils and has been stretched 4.76 times in the machine direction and 5 times in the transverse direction. The expanded tube is passed through a quench ring having a diameter of 25 inches and a height of 6 inches. The quench ring is maintained at a temperature of 5°C. and the expanded tube, upon leaving the quench ring, has a temperature of 10°C.

The cooled oriented film is then tested for shrinkage by subjecting it to a temperature of 130°C. for 1 minute. The film exhibits a machine direction shrinkage of 8.4 and a transverse direction shrinkage of 10.7 for a total shrinkage of 19.1 percent.

The total haze for the oriented film is 2.75 percent.

EXAMPLES 2-12

The procedure of Example 1 is repeated using polypropylene resins under varying process conditions. The process variables and the resulting product characteristics are summarized in Table 1. Examples 2 and 12 illustrate a conventional process having a film temperature drop and/or bubble hoop stress outside of the requirements of the instant invention.

EXAMPLES 13-19

The procedure of Example 1 is repeated using a polypropylene commercially available from the Hercules Powder Company as "Profax" TB-333. The molten polypropylene tube is extruded at the rate of 500 lbs./hr. The process variables and the resulting product characteristics are summarized below in Table 2.

combined machine direction and transverse direction shrinkages of the resulting film exceed the desired 25 percent.

We claim:

1. In the process for orienting a tubular sheet of polypropylene film by heating the film to a temperature within the orientation temperature range and biaxially stretching the film by radial expansion and linear extension of the tube, and cooling by quenching at maximum expansion, the improvement for providing a film having a combined machine direction and transverse direction shrinkage after orientation of less than 25 percent and a total haze of less than about 5 percent which comprises
   a. forcing a gas upon the exterior of the tubular sheet while expanding,
   b. subsequently passing the tubular sheet in proximity to a heat source having a temperature of at least 50°C. so as to maintain the temperature drop of the film to not more than 15°C. from the initial radial expansion to the point at which the tube reaches its maximum expanded diameter and
   c. maintaining a bubble hoop stress no greater than 3,200 psi prior to cooling.

2. A process of claim 1 wherein the temperature of the expanding film is maintained above 130°C.

3. A process of claim 1 wherein the temperature drop of the film is regulated by a heating means on the

TABLE 1

| Example | Bubble diameter, in. | Film thickness, mil | Heated ring temp., °C. | MD x TD stretch ratio | Bubble pressure in H₂O | Hoop stress, p.s.i. | Film temp. drop, °C. | Shrinkage percent at 130° C./1 min. | | |
|---|---|---|---|---|---|---|---|---|---|---|
| | | | | | | | | MD | TD | Total |
| 2 | 25 | 0.5 | 55 | 5 x 5 | 4 | 3,600 | 15 | 8.2 | 17.2 | 25.4 |
| 3 | 25 | 0.5 | 75 | 5 x 5 | 3.5 | 3,150 | 12 | 9 | 13 | 22 |
| 4 | 25 | 0.56 | 90 | 5 x 5 | 3 | 2,400 | 4 | 6 | 7.5 | 13.5 |
| 5 | 25 | 0.56 | 110 | 5 x 5 | 2.5 | 2,010 | 6 | 6.5 | 9.0 | 15.5 |
| 6 | 25 | 0.56 | 115 | 5 x 5 | 2 | 1,600 | 4 | 5.7 | 8.2 | 13.9 |
| 7 | 12.5 | 0.6 | 61 | 6 x 6 | 7.0 | 2,630 | 9 | 6.7 | 12.2 | 18.9 |
| 8 | 12.5 | 0.6 | 71 | 6 x 6 | 5.0 | 1,880 | 1 | 5.0 | 6.0 | 11.0 |
| 9 | 12.5 | 0.6 | 71 | 6 x 6 | 3.0 | 1,125 | 6 | 2.7 | 3.7 | 6.4 |
| 10 | 25 | 0.59 | 90 | 5 x 5 | 3.25 | 2,480 | 10 | 9.2 | 10.8 | 20.0 |
| 11 | 25 | 0.59 | 110 | 5 x 5 | 3.25 | 2,480 | 10 | 8.4 | 10.7 | 19.1 |
| 12 | 25 | 0.5 |  | 5 x 5 | 4.0 | 3,600 | 20 | 10 | 20 | 30 |

TABLE 2

| | Example | | | | | | |
|---|---|---|---|---|---|---|---|
| | 13 | 14 | 15 | 16 | 17 | 18 | 19 |
| Orientation conditions: | | | | | | | |
| MD stretch ratio | 5.0 | 5.0 | 5.0 | 5.0 | 5.0 | 6.0 | 5.0 |
| TD stretch ratio | 5.0 | 5.0 | 5.0 | 5.0 | 5.0 | 5.0 | 5.0 |
| Bubble pressure in H₂O | 1.6 | 1.3 | 1.0 | 0.95 | 0.85 | 1.0 | 1.9 |
| Hoop stress, p.s.i. | 3,000 | 2,300 | 1,910 | 1,870 | 1,700 | 2,095 | 4,120 |
| Heated ring, °C. | 30 | 50 | 50 | 70 | 70 | 70 | 80 |
| Air ring: | | | | | | | |
| F.p.m. | 1,200 | 1,000 | 600 | 800 | 900 | 0 | 1,300 |
| °C. | 70 | 50 | 50 | 50 | 100 |  | 78 |
| External heater, °C. | 144 | 144 | 144 | 144 | 144 | 144 | 144 |
| TD initiation temp., °C. | 148 | 148 | 148 | 148 | 148 | 148 | 148 |
| Film temperature gradient, °C. | 20 | 16 | 11 | 8 | 6 | 7 | 23 |
| Quench ring, °C. | 18 | 18 | 18 | 18 | 18 | 28 | 20 |
| Cast tube: Avg. gage, mils | 18 | 18 | 18 | 18 | 18 | 17 | 15 |
| Oriented film: | | | | | | | |
| Avg. gage, mils | 0.69 | 0.73 | 0.68 | 0.66 | 0.65 | 0.62 | 0.60 |
| Haze, percent: Total | 2.4 | 2.9 | 2.4 | 3.3 | 2.3 | 4.7 |  |
| Shrinkage percent at 130° C. 1 min.: | | | | | | | |
| MD | 9.6 | 8.7 | 8.7 | 6.2 | 7.7 | 8.2 | 12.3 |
| TD | 20.9 | 17.7 | 12.7 | 11.3 | 8.3 | 9.0 | 20.2 |

It may be noted that in those examples in which the film temperature drop (gradient) and/or the bubble hoop stress exceed the limitations of the process of the instant invention, namely, Examples 13, 14, and 19, the exterior of the tube having a fluid circulating therethrough at a temperature of about from 50° to 155°C.

* * * * *